（12) United States Patent
Koskinen et al.

(10) Patent No.: US 10,966,221 B2
(45) Date of Patent: Mar. 30, 2021

(54) UPLINK SCHEDULING WITH WLAN/3GPP AGGREGATION

(71) Applicant: Nokia Technologies Oy, Espoo (FI)

(72) Inventors: Jussi-Pekka Koskinen, Oulu (FI); Jarkko Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/550,238

(22) PCT Filed: Feb. 13, 2015

(86) PCT No.: PCT/US2015/015837
§ 371 (c)(1),
(2) Date: Aug. 10, 2017

(87) PCT Pub. No.: WO2016/130146
PCT Pub. Date: Aug. 18, 2016

(65) Prior Publication Data
US 2018/0035443 A1    Feb. 1, 2018

(51) Int. Cl.
*H04W 72/12*    (2009.01)
*H04W 74/02*    (2009.01)
(Continued)

(52) U.S. Cl.
CPC ....... *H04W 72/1205* (2013.01); *H04W 28/08* (2013.01); *H04W 76/15* (2018.02);
(Continued)

(58) Field of Classification Search
CPC . H04W 28/08; H04W 72/1205; H04W 76/15; H04W 76/16; H04W 84/12;
(Continued)

(56) References Cited

U.S. PATENT DOCUMENTS 9,474,067 B2 * 10/2016 Damnjanovic ... H04W 72/0446
9,699,800 B2 *  7/2017 Himayat ............... H04W 76/11
(Continued)

FOREIGN PATENT DOCUMENTS

CN    101536360    9/2009
CN    101536565    9/2009
(Continued)

OTHER PUBLICATIONS

"New SI Proposal: LTE-WLAN Radio Level Integration", 3GPP TSG RAN Meeting #66, RP-142281, Agenda Item: 14.1.2, Intel Corporation, Dec. 8-11, 2014, 8 pages.
(Continued)

*Primary Examiner* — Ahmed Elallam
(74) *Attorney, Agent, or Firm* — Mintz Levin Cohn Ferris Glovsky and Popeo, P.C.

(57) ABSTRACT

In some example embodiments there is provided a method. The method may include receiving, at a user equipment, configuration information, wherein the configuration information at least configures the user equipment for wireless local area network aggregation with cellular; and dividing, based on the received configuration, packet transmission between a cellular transceiver and a wireless local area network transceiver. Related systems, methods, and articles of manufacture are also described.

17 Claims, 5 Drawing Sheets

(51) Int. Cl.
| | | |
|---|---|---|
| H04W 74/04 | (2009.01) | |
| H04W 92/04 | (2009.01) | |
| H04W 76/15 | (2018.01) | |
| H04W 28/08 | (2009.01) | |
| H04W 76/16 | (2018.01) | |
| H04W 88/06 | (2009.01) | |
| H04L 12/891 | (2013.01) | |
| H04W 84/04 | (2009.01) | |
| H04W 84/12 | (2009.01) | |

(52) U.S. Cl.
CPC .............. *H04W 76/16* (2018.02); *H04L 47/41* (2013.01); *H04W 84/042* (2013.01); *H04W 84/12* (2013.01); *H04W 88/06* (2013.01)

(58) Field of Classification Search
CPC .............. H04W 88/06; H04W 84/042; H04W 28/0858; H04W 72/1294; H04W 72/0486; H04W 28/0815; H04W 84/045; H04L 47/41
See application file for complete search history.

(56) References Cited

U.S. PATENT DOCUMENTS

| | | | | |
|---|---|---|---|---|
| 9,788,242 | B2* | 10/2017 | Nuggehalli | H04W 48/08 |
| 9,900,868 | B2* | 2/2018 | Lee | H04W 72/1284 |
| 9,918,251 | B2* | 3/2018 | Ozturk | H04W 28/0273 |
| 10,034,186 | B2* | 7/2018 | Lee | H04W 76/15 |
| 10,075,381 | B2* | 9/2018 | Hsu | H04W 72/0486 |
| 10,420,021 | B2* | 9/2019 | Kim | H04W 28/08 |
| 10,524,242 | B2* | 12/2019 | Takahashi | H04W 72/042 |
| 10,631,354 | B2* | 4/2020 | Fujishiro | H04W 76/15 |
| 10,820,224 | B2* | 10/2020 | Lee | H04W 24/10 |
| 2011/0305220 | A1* | 12/2011 | Lindoff | H04W 28/26 370/331 |
| 2013/0322347 | A1 | 12/2013 | Alex | |
| 2014/0177507 | A1* | 6/2014 | Hsu | H04W 76/16 370/312 |
| 2014/0293970 | A1* | 10/2014 | Damnjanovic | H04L 5/0078 370/336 |
| 2014/0328318 | A1* | 11/2014 | Sundararajan | H04W 40/36 370/331 |
| 2014/0341148 | A1* | 11/2014 | Keskitalo | H04W 28/16 370/329 |
| 2015/0043486 | A1 | 2/2015 | Ozturk et al. | |
| 2015/0085800 | A1* | 3/2015 | Sivanesan | H04L 5/0055 370/329 |
| 2015/0195759 | A1* | 7/2015 | Sirotkin | H04W 8/005 370/331 |
| 2015/0271729 | A1* | 9/2015 | Sirotkin | H04W 48/00 370/332 |
| 2015/0334599 | A1* | 11/2015 | Maaref | H04L 5/0041 370/236 |
| 2016/0029296 | A1* | 1/2016 | Bergstrom | H04W 76/16 455/418 |
| 2016/0119939 | A1* | 4/2016 | Himayat | H04W 28/0278 370/329 |
| 2016/0219480 | A1* | 7/2016 | Roeland | H04W 28/0268 |
| 2016/0234726 | A1* | 8/2016 | Nuggehalli | H04W 36/0022 |
| 2016/0234808 | A1* | 8/2016 | da Silva | H04W 72/02 |
| 2017/0094572 | A1* | 3/2017 | Yang | H04W 36/14 |
| 2017/0272368 | A1* | 9/2017 | Mestanov | H04W 12/08 |
| 2017/0318501 | A1* | 11/2017 | Vikberg | H04W 72/085 |
| 2017/0318514 | A1* | 11/2017 | Chang | H04W 48/18 |
| 2017/0367007 | A1* | 12/2017 | Sirotkin | H04L 63/0428 |
| 2017/0374579 | A1* | 12/2017 | Wang | H04W 28/08 |
| 2017/0374610 | A1* | 12/2017 | Kim | H04W 28/02 |

FOREIGN PATENT DOCUMENTS

| | | | |
|---|---|---|---|
| EP | 2624653 | A1 | 8/2013 |
| EP | 2704481 | A1 | 3/2014 |
| EP | 2750461 | A1 | 7/2014 |
| EP | 2938127 | A1 | 10/2015 |
| EP | 2947925 | A1 | 11/2015 |
| WO | WO-2008054934 | | 5/2008 |
| WO | WO-2008054935 | | 5/2008 |
| WO | 2011/159215 | A1 | 12/2011 |
| WO | 2012/093349 | A2 | 7/2012 |
| WO | 2013/126859 | A2 | 8/2013 |
| WO | WO 2013/138046 | | 9/2013 |
| WO | 2014/098505 | A1 | 6/2014 |
| WO | 2014/112595 | A1 | 7/2014 |
| WO | 2014/160763 | A1 | 10/2014 |
| WO | WO 2014/168426 | | 10/2014 |
| WO | WO2014-204716 | | 12/2014 |

OTHER PUBLICATIONS

Kiminki et al., "Coexistence-Aware Scheduling for LTE and WLAN During Hard In-Device Interference", 7th International ICST Conference on Cognitive Radio Oriented Wireless Networks and Communications, Jun. 18-20, 2012, 6 pages.

Liu et al., "Small-Cell Traffic Balancing Over Licensed and Unlicensed Bands", IEEE Transactions on Vehicular Technology, vol. 64, No. 12, Dec. 2015, pp. 5850-5865.

"New Work Item Proposal: WLAN/3GPP Radio Interworking", 3GPP TSG|WG-RAN Meeting #62, Agenda Item: 13.1.2, RP-132101, Intel Corporation, Dec. 3-6, 2013, 7 pages.

"3rd Generation Partnership Project; Technical Specification Group Radio Access Network; Evolved Universal Terrestrial Radio Access (E-UTRA); LTE physical layer; General description(Release 12)", 3GPP TS 36.201, V12.1.0, Dec. 2014, pp. 1-13.

"3rd Generation Partnership Project; Technical Specification Group Radio Access Network; Evolved Universal Terrestrial Radio Access (E-UTRA); Physical channels and modulation(Release 12)", 3GPP TS 36.211, V12.4.0, Dec. 2014, pp. 1-124.

"3rd Generation Partnership Project; Technical Specification Group Radio Access Network; Evolved Universal Terrestrial Radio Access (E-UTRA); Multiplexing and channel coding(Release 12)", 3GPP TS 36.212, V12.3.0, Dec. 2014, pp. 1-89.

"3rd Generation Partnership Project; Technical Specification Group Radio Access Network; Evolved Universal Terrestrial Radio Access (E-UTRA); Physical layer procedures(Release 12)", 3GPP TS 36.213 V12.4.0, Dec. 2014, pp. 1-225.

"3rd Generation Partnership Project;Technical Specification Group Radio Access Network; Evolved Universal Terrestrial Radio Access (E-UTRA); Physical layer; Measurements (Release 12)", 3GPP TS 36.214, V12.1.0, Dec. 2014, pp. 1-16.

"3rd Generation Partnership Project; Technical Specification Group Radio Access Network; Evolved Universal Terrestrial Radio Access (E-UTRA); Radio Resource Control (RRC);Protocol specification (Release 12)", 3GPP TS 36.331, V12.4.1, Dec. 2014, pp. 1-410.

International Search Report and Written Opinion received for corresponding Patent Cooperation Treaty Application No. PCT/US2015/015837, dated Nov. 5, 2015, 11 pages.

Office action received for corresponding Japanese Patent Application No. 2017-541603, dated Oct. 1, 2018, 3 pages of office action and 3 pages of translation available.

Office action received for corresponding European Patent Application No. 15711905.8, dated Nov. 12, 2018, 6 pages.

European Patent Office, Communication Pursuant to Article 94(3) EPC for EP Application No. 15711905.8, dated May 8, 2020, 4 pages.

Amended Claims in Response to the Communication Pursuant to Article 94(3) EPC for EP Application No. 15711905.8, dated May 8, 2020, 3 pages.

* cited by examiner

UPLINK SCHEDULING WITH WLAN/3GPP AGGREGATION

RELATED APPLICATION

This application was originally filed as Patent Cooperation Treaty Application No. PCT/US2015/015837 filed Feb. 13, 2015.

FIELD

The subject matter described herein relates to wireless communications.

BACKGROUND

The use of heterogeneous networks (HetNets) may provide opportunities for offloading traffic from macro cells to a typically higher capacity small cells. The heterogeneous network may include one or more wireless access points, such as WiFi wireless access points, serving one or more small cells, and may also include one or more base stations serving macro cells. For example, a WiFi wireless access point may be implemented to cover a small cell, or coverage area, examples of which include a residence, a small business, a building, an office, or a small area. The WiFi wireless access point may have less range and output power given its limited coverage area but provide greater capacity and data rates. Accordingly, wireless service providers view small cells as a way to extend service coverage, as a way to offload traffic to the small cells, and/or as a way to provide enhanced service, such as for example higher data rates, lower latencies, energy efficiency and the like.

SUMMARY

In some example embodiments there is provided a method. The method may include receiving, at a user equipment, configuration information, wherein the configuration information at least configures the user equipment for wireless local area network aggregation with cellular; and dividing, based on the received configuration, packet transmission between a cellular transceiver and a wireless local area network transceiver.

In some variations, one or more of the features disclosed herein including the following features can optionally be included in any feasible combination. The configuration information may include a data amount indicating at least one of a quantity, a percentage, or a ratio of packets to be transmitted via the wireless local area network transceiver to a wireless local area network access point. The configuration information may include a time indicating a time period for packets to be transmitted via the wireless local area network transceiver to a wireless local area network access point. The configuration information may include a schedule for packets to be transmitted via the wireless local area network transceiver to a wireless local area network access point. The schedule may further include scheduling for packets to be transmitted via the cellular transceiver to a base station. The schedule may be received as at least one of a command or a payload data control channel command. The wireless local area network transceiver at the user equipment may transmit a first portion of the packet transmission divided based on the received configuration, and the cellular transceiver at the user equipment may transmit a second portion of the packet transmission divided based on the received configuration. A determination may be made regarding whether the wireless local area network access point supports aggregation with cellular before the transmitting of the first portion. The configuration information may indicate to the user equipment whether an access stratum bearer and/or a non-access stratum bearer is to be transmitted via the wireless local area network transceiver or the cellular transceiver. The configuration information may indicate to the user equipment whether a logic channel is to be transmitted via the wireless local area network transceiver or the cellular transceiver. The wireless local area network transceiver may include the cellular transceiver operating on an unlicensed portion of the spectrum.

In some example embodiments there is provided a method. The method may include sending configuration information, wherein the configuration information at least enables a configuration of a user equipment for wireless local area network aggregation with cellular.

In some variations, one or more of the features disclosed herein including the following features can optionally be included in any feasible combination. The configuration information may include a data amount indicating at least one of a quantity, a percentage, or a ratio of packets to be transmitted via the wireless local area network transceiver to a wireless local area network access point. The configuration information may include a time indicating a time period for packets to be transmitted via the wireless local area network transceiver to a wireless local area network access point. The configuration information may include a schedule for packets to be transmitted via the wireless local area network transceiver to a wireless local area network access point. The schedule may further include scheduling for packets to be transmitted via the cellular transceiver to a base station. The schedule may be received as at least one of a command or a payload data control channel command. The configuration information may indicate to the user equipment whether an access stratum bearer and/or a non-access stratum bearer is to be transmitted via the wireless local area network transceiver or the cellular transceiver. The configuration information may indicate to the user equipment whether a logic channel is to be transmitted via the wireless local area network transceiver or the cellular transceiver.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims. In some exemplary embodiments, one of more variations may be made as well as described in the detailed description below and/or as described in the following features.

Figure 1:
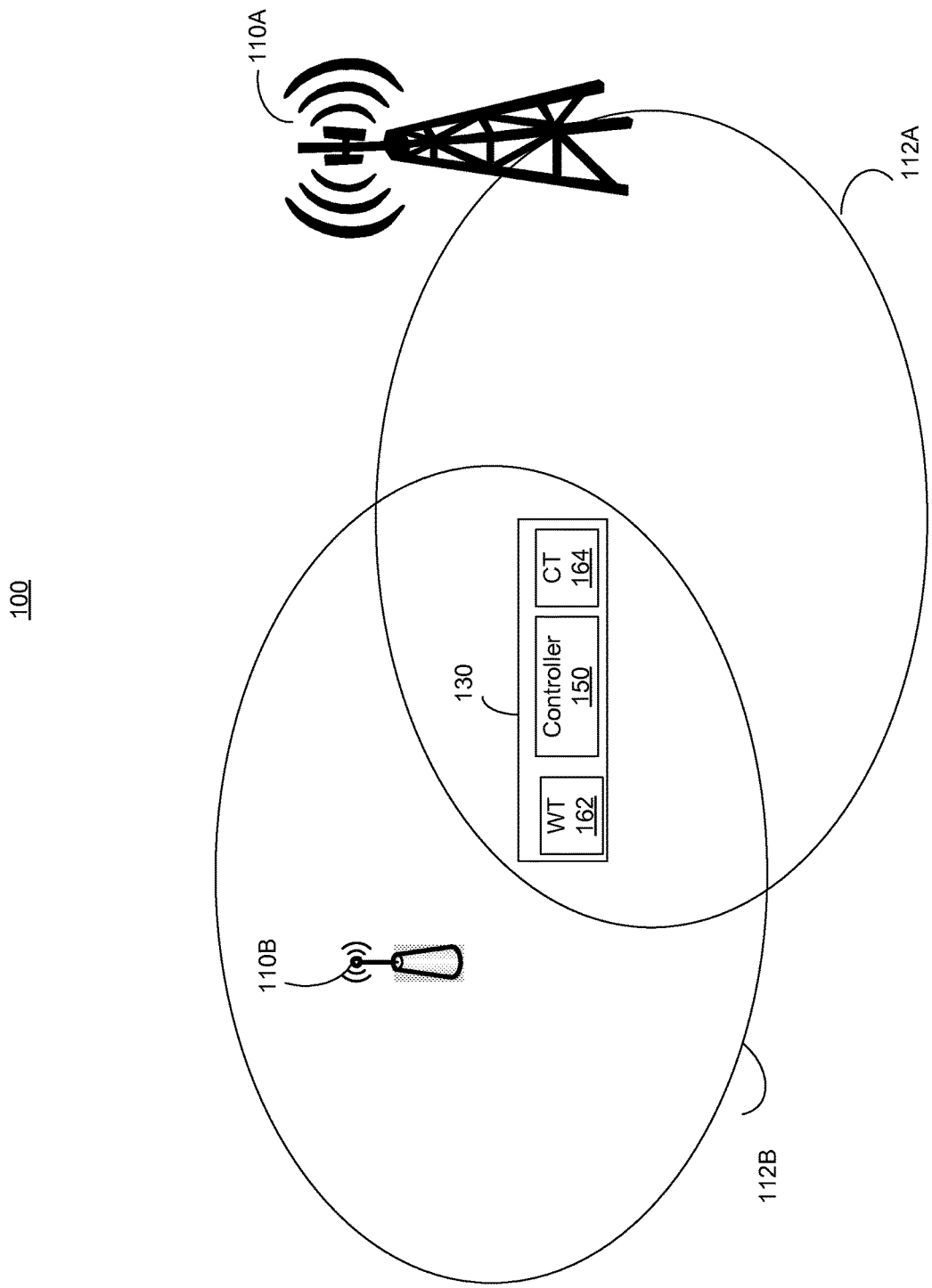
FIG. 1 depicts an example of a system for cellular and wireless local area network aggregation, in accordance with some example embodiments.

Like labels are used to refer to the same or similar items in the drawings.

DETAILED DESCRIPTION

In Hetnets, there may be provided an interworking. In interworking, the network may specify at the access point network level whether for example a data transmission should be steered to a cellular network or to a wireless local area network. This steering is somewhat static in the sense that a flow of packets from an application for example will be transmitted (as a whole and at the access point network level) via the cellular network or the wireless local area network but not both simultaneously. By contrast, cellular wireless local area network aggregation is more dynamic in the sense that a packet flow may be divided, so that packets from the flow can be divided (for example, via scheduling and the like) to the cellular network, the wireless local area network, or both. For example, a UE may divide a first portion of packets for transmission via cellular and a second portion of packets for transmission via the wireless local area network. In this example, the packets can later be combined in the network. In this way, cellular to wireless local area network aggregation enables more dynamic control (by for example the network) of both cellular and wireless local area network resources.

Moreover, user equipment (UE) may be configured to operate in an aggregate cellular radio access and wireless local area network (WLAN) radio access mode. When in the cellular WLAN aggregation mode, the UE may have an active cellular radio bearer over which packets may be transmitted or received, and the UE may have an active wireless local area network bearer over which packets are transmitted or received. In the case of an uplink (the transmit link from the UE to the base station or wireless access point) however, the UE may need to know whether to send a given packet via the UE's WLAN transceiver and WLAN uplink or via the UE's a cellular transceiver and a cellular uplink.

In some instances, cellular WLAN aggregation may enable unified control and management of both cellular and WLAN networks. In cellular WLAN aggregation, radio resource management may provide scheduling of cellular and WLAN resources. Furthermore, the generally more reliable cellular may be used as a control and mobility anchor to provide quality of experience improvements, reduce service interruption, and increase network operator control. Additional details regarding cellular WLAN aggregation can be found at 3GPP TSG RAN Meeting #67 RP-15xxxx, Shanghai, PRC, March 2015, LTE-WLAN Radio Level Integration and Interworking Enhancement as well as 3GPP TSG, WG-RAN Meeting #62, RP-132101, Korea, Busan, Dec. 3-Dec. 6, 2013, WLAN/3GPP Radio Interworking—Core.

In some example embodiments, there is provided uplink aggregation between cellular and WLAN, and this uplink aggregation is provided by a controller that directs one or more packets (for example, splits or divides portions of a packet flow from an upper-layer application) to a cellular transceiver for transmission to a cellular base station and/or a WLAN transceiver for transmission to a WLAN wireless access point. The controller may direct the packet(s) to the UE's cellular transceiver or the WLAN wireless access point based on one or more factors. These factors may include an amount of data, a time parameter, a schedule, and/or special scheduling (which may be via cellular, a specific bearer, and/or a specific logical channel). Alternatively or additionally, uplink aggregation may be performed, in some example embodiments, via the UE's WLAN transceiver when other conditions and/or thresholds are satisfied.

FIG. 1 depicts an example system 100 including a WLAN wireless access point 110B serving a coverage area 112B and a cellular base station 110A, such as for example an evolved Node B base station 110A, serving a macrocell 112A, in accordance with some example embodiments.

System 100 may also include a user equipment 130 having a controller 150, a cellular transceiver 164, and a WLAN transceiver 162, in accordance with some example embodiments. The cellular transceiver may transmit a cellular uplink to base station 110A and/or receive a cellular downlink from base station 110A, and WLAN transceiver may transmit an WLAN uplink to WLAN wireless access point 110B and/or receive a WLAN downlink from WLAN wireless access point 110B.

Although FIG. 1 depicts a specific quantity and configuration of base stations/access points, cells, and user equipment, other quantities and configurations may be implemented as well. Moreover, the base station and wireless access point may include backhaul links to other networks (for example, the internet), nodes (other base stations, wireless access points, gateways, and so forth), and the like.

As noted, the user equipment 130 including controller 150 may have to decide, in the case of WLAN/cellular aggregation, whether a given packet (from for example a higher level application at the UE) should be transmitted by the cellular transceiver (via a cellular carrier frequency) or the WLAN transceiver transmit (via a WLAN carrier frequency). To that end, a controller 150, in a WLAN/cellular aggregation mode, may determine whether a given packet should be transmitted via the cellular transceiver or the WLAN transceiver.

In some example embodiments, the controller 150 may divide (or split) a data or packet flow to an uplink at the WLAN transceiver 162 or an uplink at the cellular transceiver 164, and this dividing may be based on network configuration information including an amount of data or time.

In some example embodiments, UE 130 may be configured by for example the network based on a data amount. For example, the network may send configuration information (for example, via signaling, a broadcast, and/or the like), and this configuration information may indicate a packet count, so any packets above the packet count threshold can be sent to for example the WLAN transceiver 162. In some example embodiments, the network's configuration information may indicate that certain packets (for example, every $x^{th}$ packet) should be sent to for example the WLAN transceiver 162. For example, the controller 150 may be configured to send every $2^{nd}$ packet to the WLAN transceiver 162 for transmission. In some example embodiments, the network's configuration information may indicate that a certain percentage of packets should be sent to the WLAN transceiver 162 for transmission. In some example embodiments, the network's configuration information may indicate that a certain ratio of packets should be sent to the WLAN transceiver 162 for transmission. For example, the controller 150 may be configured to maintain a packet ratio between WLAN transceiver and the cellular transceiver. In some example embodiments, the network's configuration information may indicate an amount of bytes. For example, the network indication to the controller 150 may specify a given amount of packets (for example, 500 packets) should be sent. In some example embodiments, the network's configuration information may indicate a given percentage of packets. For example, the network indication to the controller 150 may specify that x percent of data should to be sent via WLAN. Although the previous examples describe the network controlling routing of packets to the WLAN transceiver, the network may indicate which packets get routed to the cellular transceiver as well.

In some example embodiments, UE 130 may be configured by for example the network based on time. For example, the network may configure the controller 150 to send packets to a certain transceiver at a certain time. To illustrate further, the controller may send packets to the WLAN transceiver for 10 milliseconds for example, and then send on the cellular transceiver for another 10 milliseconds. In some example embodiments, controller 150 may be configured to send on both the WLAN transceiver and the cellular transceiver for a certain period of time (for example, y milliseconds, ms) but then send only on the cellular transceiver for another period of time (for example x ms).

In some example embodiments, the network may schedule uplink transmission. For example, the cellular network may signal the UE 130 via base station 110A with a schedule. This schedule may allocate resources including times (and/or amount of data) when the UE 130 can transmit an uplink (via the cellular transceiver 164) to base station 110A and when UE 130 can transmit another uplink (via the WLAN transceiver 162) to WLAN wireless access point 110B. The network may send a command, such as a payload data control channel (PDCCH) command or an extended PDCCH command, to explicitly schedule transmission via the cellular uplink (via the cellular transceiver 164) or the WLAN uplink (via the WLAN transceiver 162). Alternatively or additionally, the network may provide a semi-persistent scheduling command indicating at which times the UE can transmit via the WLAN uplink. This network scheduling commands may also indicate the amount of data to be sent via the cellular uplink (via the cellular transceiver 164) or WLAN uplink (via the WLAN transceiver 162).

In some example embodiments, the UE may report to the network (for example, base station 110A or wireless access point 110B) that a cellular-WLAN aggregation condition is satisfied. Next, the network may configure (for example, provide information, activate, and/or the like) a cellular WLAN aggregation mode at the UE. The UE may send to the network an uplink buffer status report indicating for example, an amount of data (for example, 100 bytes) which are available and ready for transmission via a cellular uplink. The UE may also send to the network an available amount of data for WLAN transmission as well. The network may send to the UE an uplink grant indicating that a certain amount of data (for example, 50 bytes) may be transmitted via the cellular uplink and another amount of data may be transmitted by the WLAN uplink (for example, 50 bytes). In some example embodiments, the network may determine a schedule for uplink grant. This schedule may be determined based on load in both WLAN and cellular systems (for example, to avoid congestion or provide load balancing), latency requirements of the data/packets, throughput requirements of the data/packets, and/or quality of service demands (for example, the UE's subscriber class with respect to quality of service). In response to the grant, the UE may transmit data (for example, 50 bytes via the cellular uplink and another amount of data (for example, 50 bytes) via the WLAN uplink (for example, 50 bytes). The cellular uplink may be within a licensed band, although unlicensed bands may be used as well.

Figure 2:
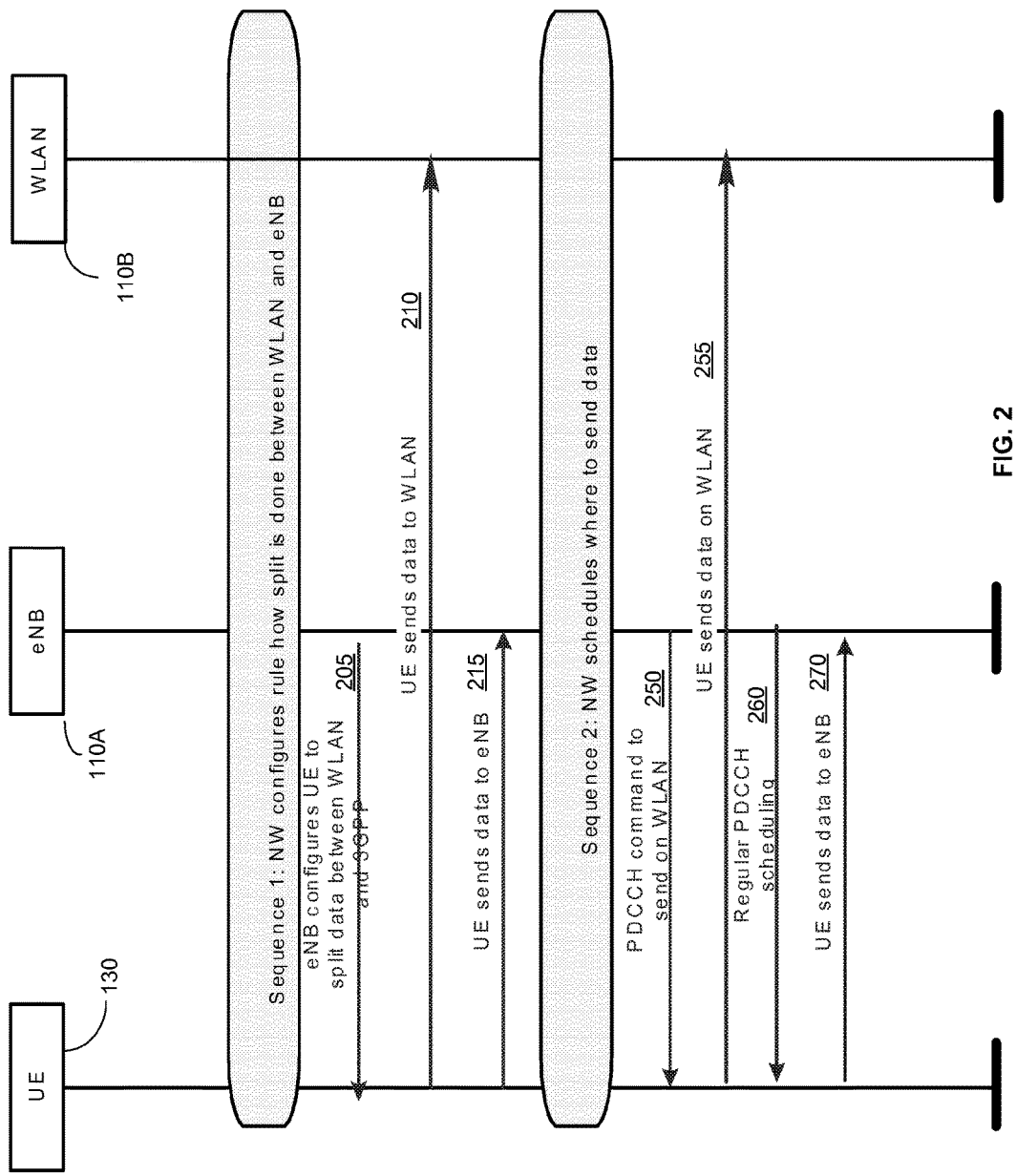
FIG. 2 depicts an example of a process for cellular and wireless local area network aggregation, in accordance with some example embodiments.

FIG. 2 depicts an example of a signaling diagram 200, in accordance with some example embodiments. The signaling diagram includes a sequence 205-215 based on a data amount or time, and includes a second sequence 250-270 based on a schedule. The description of FIG. 2 also refers to FIG. 1.

At 205, the network may configure the UE with information indicating how the UE should divide data between a WLAN transceiver/WLAN uplink and a cellular transceiver/cellular uplink, in accordance with some example embodiments. For example, a node, such as base station 110A and/or any other node, may send configuration information to UE 130. The configuration may indicate to the UE 130 including controller 150 which transceiver 162 or 164 to use and thus how to split/divide packets between the WLAN transceiver/WLAN uplink and the cellular transceiver/cellular uplink. As noted above, the configuration information may be based on data amount (for example, packet count, bytes, percentages, ratios, and/or the like) or time (for example, send via WLAN for x milliseconds and then via cellular for y milliseconds). In some example embodiments, the UE may divide packets so that at least one packet is routed to the WLAN transceiver for transmission, at 210, to the wireless access point 110B via the WLAN transceiver and uplink in accordance with the configuration of 205; and the UE may also divide packets so that at least one packet is routed to the cellular transceiver for transmission, at 215, to the base station 110A via the cellular transceiver and uplink in accordance with the configuration of 205, in accordance with some example embodiments.

At 250, the base station 110A may send a command, such as a PDCCH command, to UE 130, and this command may indicate a schedule for sending data via the WLAN transceiver and WLAN uplink, in accordance with some example embodiments. In the case of a PDCCH command, it may be extended to explicitly schedule transmission via the WLAN uplink (and the WLAN transceiver 162).

At 255, the UE may divide packets so that at least one packet is routed to the WLAN transceiver for transmission to the wireless access point 110B via the WLAN transceiver and uplink in accordance with the schedule provided at 250, in accordance with some example embodiments.

At 260, the base station 110A may send a command, such as a PDCCH command, to UE 130, and this command may indicate a schedule for sending data via the cellular transceiver and cellular uplink, in accordance with some example embodiments. At 270, the UE may divide packets so that at least one packet is routed to the cellular transceiver for transmission to the base station 110A via the cellular transceiver and uplink in accordance with the schedule provided at 260, in accordance with some example embodiments.

Thus, in some example embodiments, data from for example an application at the UE may be sent to a destination (for example, an application server and the like). When the WLAN wireless access point allows cellular WLAN aggregation, the UE may divide the data/packets for transmission between the cellular transceiver and the WLAN transceiver as described above with respect to FIG. 2 for example.

Figure 3:
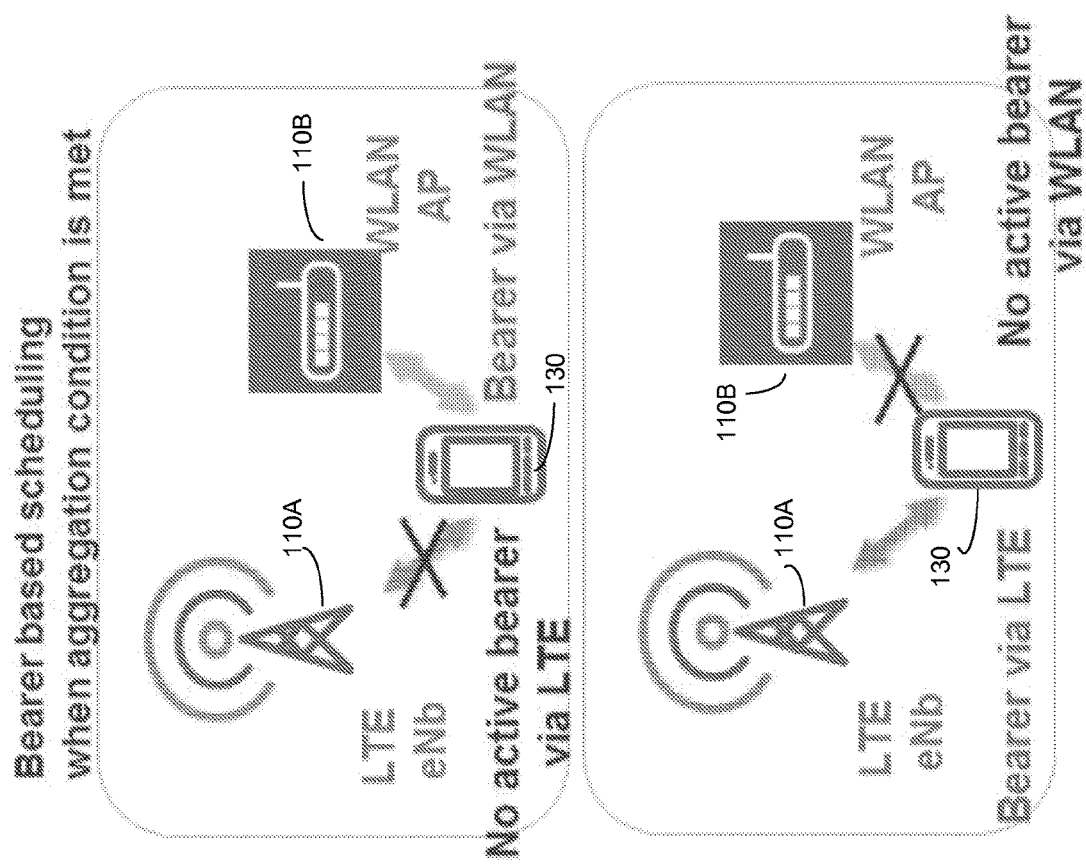
FIG. 3 depicts another example of a system for cellular and wireless local area network aggregation, in accordance with some example embodiments.

FIG. 3 depicts an example of UE 130, in accordance with some example embodiments. In the example embodiment of FIG. 3, UE 130 may move data/packets from a buffer (or stack) for transmission via the cellular uplink to another buffer/stack for transmission via the WLAN uplink (and vice versa). The UE may move the data based on a trigger, such as a command from the network or a condition at the UE (for example, congestion, signal quality, and/or the like). In this way, if a radio bearer is lost, the UE may recover by transmitting the data/packets queued for transmission via the lost radio bearer.

In some example embodiments, data/packets associated with a specific bearer (for example, access stratum or non-access stratum as configured for the UE by the network) may be transmitted in accordance with a network configuration provided at for example 205. For example, access stratum may be transmitted via the cellular transceiver and uplink based on the network configuration (although the access stratum may also be configured, based on the network configuration, for the WLAN transceiver/uplink instead).

In some example embodiments, data/packets belonging to specific logical channel (configured for the UE by the network) may be transmitted in accordance with the network configuration provided at for example 205. For example, data/packets belonging to specific logical channel may be transmitted via the cellular transceiver and uplink based on the network configuration (although the data/packets belonging to specific logical channel may also be configured, based on the network configuration, for the WLAN transceiver/uplink instead).

Additionally or alternatively, uplink transmissions describe herein at for example FIG. 2 may be performed via the WLAN transceiver when the WLAN is an aggregatable condition, such as when one or more conditions and/or thresholds are satisfied. To determine whether the WLAN can be used in a cellular WLAN aggregation mode, one or more of the following conditions may be considered: whether the UE has detected WLAN AP that is advertised as 3GPP/WLAN aggregation WLAN; whether the UE has data available for transmission (for example, more than thresholds); whether the UE has certain data available for transmission (for example, data belongs to certain priority, LCID, AS/NAS bearer, APN, QoS, QCI); and/or whether WLAN and 3GPP thresholds are met, such as ThreshServingOffloadWLAN, LowP (which specifies the RSRP threshold (in dBm) used by the UE for traffic steering to WLAN), ThreshServingOffloadWLAN, HighP (which specifies the RSRP threshold (in dBm) used by the UE for traffic steering to E-UTRAN), ThreshServingOffloadWLAN, LowQ (which specifies the RSRQ threshold (in dB) used by the UE for traffic steering to WLAN), ThreshServingOffloadWLAN, HighQ (which specifies the RSRQ threshold (in dB) used by the UE for traffic steering to E-UTRAN), ThreshChUtilWLAN, Low (which specifies the WLAN channel utilization (BSS load) threshold used by the UE for traffic steering to WLAN), ThreshChUtilWLAN, High (which specifies the WLAN channel utilization (BSS load) threshold used by the UE for traffic steering to E-UTRAN), ThreshBackhRateDLWLAN, Low (which specifies the backhaul available downlink bandwidth threshold used by the UE for traffic steering to E-UTRAN), ThreshBackhRateDLWLAN, High (which specifies the backhaul available downlink bandwidth threshold used by the UE for traffic steering to WLAN), ThreshBackhRateULWLAN, Low (which specifies the backhaul available uplink bandwidth threshold used by the UE for traffic steering to E-UTRAN), ThreshBackhRateULWLAN, High (which specifies the backhaul available uplink bandwidth threshold used by the UE for traffic steering to WLAN), ThreshBeaconRSSIWLAN, Low (which specifies the Beacon RSSI threshold used by the UE for traffic steering to E-UTRAN), and ThreshBeaconRSSIWLAN, High (which specifies the Beacon RSSI threshold used by the UE for traffic steering to WLAN).

Figure 4:
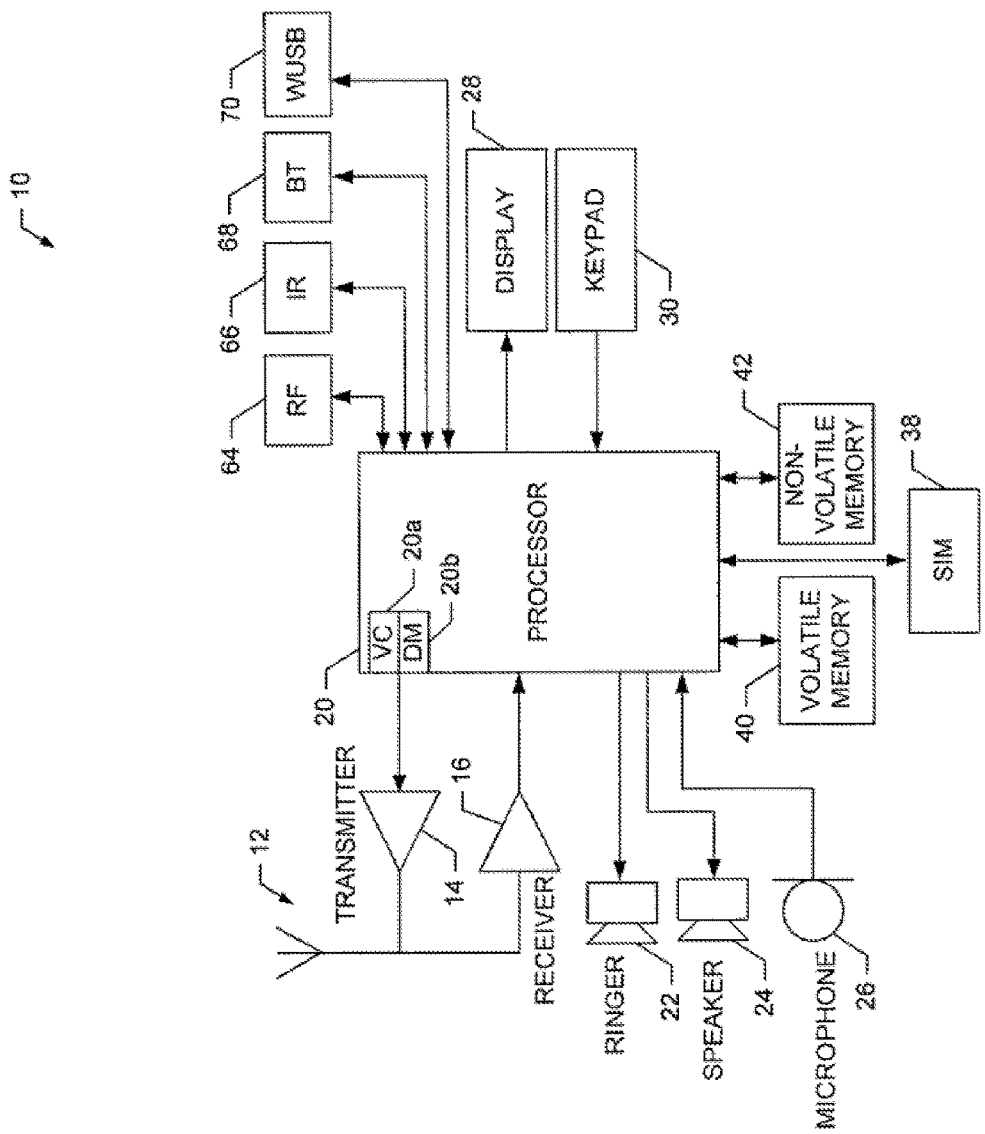
FIG. 4 depicts an example of an apparatus, in accordance with some example embodiments.

FIG. 4 depicts an example of an apparatus 10, in accordance with some example embodiments. The apparatus 10 may comprise user equipment 130, such as a smart phone, a tablet, a cell phone, a wearable radio device, a tag, an Internet of Things device, and/or any other radio based device.

In some example embodiments, apparatus 10 may also include a radio communication link to a cellular network, or other wireless network. The apparatus 10 may include an antenna array 12 in communication with a transmitter 14 and a receiver 16. Alternatively transmit and receive antennas may be separate.

The apparatus 10 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor (s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 10 may include a location processor and/or an interface to obtain location information, such as positioning and/or navigation information. Accordingly, although illustrated in as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 500 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 500 may be capable of operating in accordance with 2.5G wireless communication protocols General Packet Radio Service (GPRS), Enhanced Data GSM Environment (EDGE), and/or the like. Further, for example, the apparatus 500 may be capable of operating in accordance with 3G wireless communication protocols, such as, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 130 may be additionally capable of operating in accordance with 3.9G wireless communication protocols, such as, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 500 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as, a web browser. The connectivity program may allow the apparatus 10 to transmit and receive web content, such as location-based content, according to a protocol, such as, wireless application protocol, wireless access point, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 500 may include a battery for powering various circuits related to the mobile terminal, for example, a circuit to provide mechanical vibration as a detectable output. The user input interface may comprise devices allowing the apparatus 10 to receive data, such as, a keypad 30 (which can be a virtual keyboard presented on display 28 or an externally coupled keyboard) and/or other input devices.

Moreover, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, Bluetooth Low-Energy, NFC, and other radio standards. In this regard, the apparatus 10 and, in particular, the short-range transceiver may be capable of transmitting data to and/or receiving data from electronic devices within proximity of the apparatus, such as within 10 meters. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as, a subscriber identity module (SIM) 38, a removable user identity module (R-UIM), and/or the like, which may store information elements related to a mobile subscriber. In addition to the SIM, the apparatus 500 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations as described herein at for example process 200. The memories may comprise an identifier, such as an international mobile equipment identification (IMEI) code, capable of uniquely identifying apparatus 500. The functions may include one or more of the operations disclosed herein with respect to process 200. In the example embodiment, the processor 20 may be configured using computer code stored at memory 40 and/or 42 to provide the operations, such as receiving, at a user equipment, configuration information, wherein the configuration information at least configures the user equipment for wireless local area network aggregation with cellular; and dividing, based on the received configuration, packet transmission between a cellular transceiver and a wireless local area network transceiver.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, the process 200 and the like).

Figure 5:
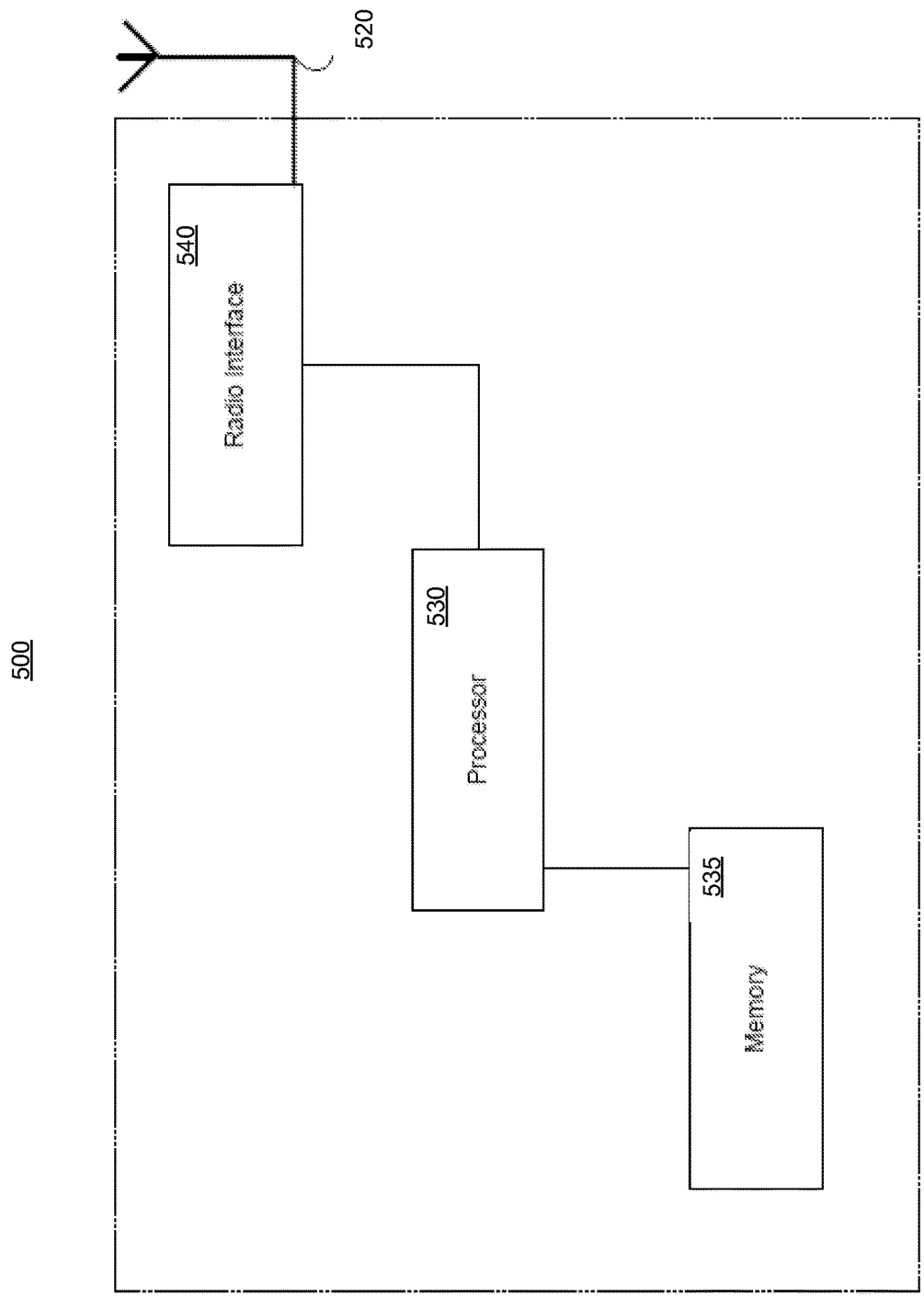
FIG. 5 depicts another example of an apparatus, in accordance with some example embodiments.

FIG. 5 depicts an example implementation of a network node 500, such as a wireless access point 110B or a base station 110A, in accordance with some example embodiments. The node 500 may include one or more antennas 520 configured to transmit via downlinks and configured to receive uplinks via the antenna(s) 520. The node 500 may further include a plurality of radio interfaces 540 coupled to the antenna(s) 520. The radio interfaces 540 may correspond to a plurality of radio access technologies including one or more of cellular, LTE, WLAN, Bluetooth, BT-LE, NFC, radio frequency identifier (RFID), ultrawideband (UWB), ZigBee, and the like. The radio interface 540 may include circuitry, such as filters, converters (for example, digital-to-analog converters and the like), mappers, a Fast Fourier Transform (FFT) module, and the like. The node 500 may further include one or more processors, such as processor circuitry 530, for controlling the node 500 and for accessing and executing program code stored in memory 535. In some example embodiments, the memory 535 includes program code, which when executed by at least one processor, causes one or more of the operations described herein with respect to the base station 110A and/or wireless access point 110B. For example, the operations may include providing the configuration information to the UE to enable the cellular WLAN aggregation, sending an indication to aggregating the WLAN traffic with the cellular traffic, and/or perform any other operations associated with the base station 110A and/or wireless access point 110B disclosed herein.

The base station 110A may, in some example embodiments, be implemented as an evolved Node B (eNB) type base station, although other types of radio, access points may be implemented as well such as WLAN or Wi-Fi type of access point. When the evolved Node B (eNB) type base station is used, the base may be configured in accordance with standards, including the Long Term Evolution (LTE) standards, such as for example 3GPP TS 36.201, Evolved Universal Terrestrial Radio Access (E-UTRA), Long Term Evolution (LTE) physical layer, General description, 3GPP TS 36.211, Evolved Universal Terrestrial Radio Access (E-UTRA), Physical channels and modulation, 3GPP TS 36.212, Evolved Universal Terrestrial Radio Access (E-UTRA), Multiplexing and channel coding, 3GPP TS 36.213, Evolved Universal Terrestrial Radio Access (E-UTRA), Physical layer procedures, 3GPP TS 36.214, Evolved Universal Terrestrial Radio Access (E-UTRA), Physical layer—Measurements Protocol specification, 3GPP TS 36.331, Technical Specification Group Radio Access Network, Evolved Universal Terrestrial Radio Access (E-UTRA), Radio Resource Control (RRC), and any subsequent additions or revisions to these and other 3GPP series of standards (collectively referred to as LTE standards). The wireless access point 110—may also be configured to serve cells using a WLAN technology, such as for example WiFi (for example, the IEEE 802.11 series of standards), as well as any other radio access technology capable of serving a cell.

Without in any way limiting the scope, interpretation, or application of the claims appearing below, a technical effect of one or more of the example embodiments disclosed herein is enhanced data throughput and/or enhanced flexibility with respect to uplink scheduling.

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
receiving, at a user equipment and from a network, configuration information, wherein the configuration information at least configures the user equipment for wireless local area network aggregation with cellular, wherein the configuration information includes a packets size threshold, and wherein the user equipment determines, based on the packets size threshold, whether to transmit one or more packets via a wireless local area network transceiver to a wireless local area network access point; and
dividing, based on the received configuration including the packets size threshold, packet transmission between a cellular transceiver and the wireless local area network transceiver.

2. The method of claim 1, wherein the configuration information includes a time indicating a time period for packets to be transmitted via the wireless local area network transceiver to a wireless local area network access point.

3. The method of claim 1, wherein the configuration information includes a schedule for packets to be transmitted via the wireless local area network transceiver to a wireless local area network access point or via the cellular transceiver to a base station.

4. The method of claim 1 further comprising:
transmitting, by the wireless local area network transceiver at the user equipment, a first portion of the packet transmission divided based on the received configuration; and
transmitting, by the cellular transceiver at the user equipment, a second portion of the packet transmission divided based on the received configuration.

5. The method of claim 1, wherein the configuration information indicates to the user equipment whether an access stratum bearer and/or a non-access stratum bearer is to be transmitted via the wireless local area network transceiver or the cellular transceiver.

6. The method of claim 1, wherein the configuration information indicates to the user equipment whether a logic channel is to be transmitted via the wireless local area network transceiver or the cellular transceiver.

7. An apparatus, comprising:
at least one processor; and
at least one memory including computer program code, the at least one memory and the computer program code configured to, with the at least one processor, cause the apparatus to at least:
receive, at the apparatus and from a network, configuration information, wherein the configuration information at least configures the apparatus for wireless local area network aggregation with cellular, wherein the configuration information includes a packets size threshold, and wherein the apparatus determines, based on the packets size threshold, whether to transmit one or more packets via a wireless local area network transceiver to a wireless local area network access point; and
divide, based on the received configuration including the packets size threshold, packet transmission between a cellular transceiver and the wireless local area network transceiver.

8. The apparatus of claim 7, wherein the configuration information includes a time indicating a time period for packets to be transmitted via the wireless local area network transceiver to a wireless local area network access point.

9. The apparatus of claim 7, wherein the configuration information includes a schedule for packets to be transmitted via the wireless local area network transceiver to a wireless local area network access point or via the cellular transceiver to a base station.

10. The apparatus of claim 7, wherein the apparatus is further configured to at least:
transmit, by the wireless local area network transceiver at the apparatus, a first portion of the packet transmission divided based on the received configuration; and
transmit, by the cellular transceiver at the apparatus, a second portion of the packet transmission divided based on the received configuration.

11. The apparatus of claim 7, wherein the configuration information indicates to the apparatus whether an access stratum bearer and/or a non-access stratum bearer is to be transmitted via the wireless local area network transceiver or the cellular transceiver.

12. The apparatus of claim 7, wherein the configuration information indicates to the apparatus whether a logic channel is to be transmitted via the wireless local area network transceiver or the cellular transceiver.

13. An apparatus, comprising:
at least one processor; and
at least one memory including computer program code, the at least one memory and the computer program code configured to, with the at least one processor, cause the apparatus to at least:
send configuration information to a user equipment, wherein the configuration information at least enables a configuration of a user equipment for wireless local area network aggregation with cellular, wherein the configuration information includes a packets size threshold, and wherein the packets size threshold enables the user equipment to determine whether to transmit one or more packets via a wireless local area network transceiver of the user equipment to a wireless local area network access point.

14. The apparatus of claim 13, wherein the configuration information includes a time indicating a time period for packets to be transmitted via the wireless local area network transceiver to a wireless local area network access point.

15. The apparatus of claim 13, wherein the configuration information includes a schedule for packets to be transmitted via the wireless local area network transceiver to a wireless local area network access point or via the cellular transceiver to a base station.

16. The apparatus of claim 13, wherein the configuration information indicates to the user equipment whether an access stratum bearer and/or a non-access stratum bearer is to be transmitted via the wireless local area network transceiver or the cellular transceiver.

17. The apparatus of claim 13, wherein the configuration information indicates to the user equipment whether a logic channel is to be transmitted via the wireless local area network transceiver or the cellular transceiver.

* * * * *